United States Patent Office 3,689,428
Patented Sept. 5, 1972

3,689,428
NUCLEAR FUEL HAVING MINIMUM-GAS-
RELEASE PROPERTIES
William H. Pechin and Ronnie A. Bradley, Oak Ridge, and John D. Sease, Knoxville, Tenn., assignors to the United States of America as represented by the United States Atomic Energy Commission
No Drawing. Filed June 8, 1970, Ser. No. 44,572
Int. Cl. G21c 19/42
U.S. Cl. 252—301.1 R          4 Claims

ABSTRACT OF THE DISCLOSURE

This invention relates to an improved nuclear fuel composition characterized as a hypostoichiometric solid solution of an oxide of plutonium and uranium, having a surface-to-volume ratio of greater than 100 in.$^{-1}$ and a gas-release index of no more than 0.1 cc./g. of fuel as measured at 1600° C., and to the process for making same.

BACKGROUND OF THE INVENTION

The invention described herein was made in the course of, or under, a contract with the U.S. Atomic Energy Commission.

The present invention relates to an improved solid nuclear fuel composition and to a method for its preparation. More particularly, it relates to a stabilized solid solution of plutonium and uranium oxide, where the term "stabilized" refers to a less chemically reactive and more physically stable composition resulting from the process to be described in comparison to the untreated mixed-oxide fuel.

Because of their relatively advanced technology, mixed-oxide fuels of urania and plutonia have been selected the material of choice for use as a fuel in the design and construction of fast breeder reactors. A typical reactor of this type is known as the Liquid Metal Fast Breeder Reactor in which a candidate fuel consists of densified compacts of a solid solution of plutonium and uranium oxide within a stainless steel cladding. Continued testing of stainless-steel-clad, mixed-oxide fuel elements of this type has shown that there is a strong need to reduce fuel-cladding chemical and mechanical interactions that occur during irradiation which adversely reflect upon the thermal performance and designed reliability limits of the fuel.

In order to ameliorate or at least reduce the reaction of the fuel with the cladding, it has been proposed to employ so-called hypostoichiometric fuel based on experimental evidence which shows that hypostoichiometry contributes to the stability of the fuel. In a solid-solution fuel of the type discussed here, a hypostoichiometric condition is one in which the ratio of oxygen to the sum of the plutonium and uranium content of the fuel is less than 2 and will normally run in the range 1.95 to 1.99. This range should remain below 2 during the fuel life. Methods for the production of hypostoichiometry in oxide and mixed-oxide fuels are well known and do not as such constitute a part of this invention, although a condition of hypostoichiometry is either presupposed or is a part of the process by which the improved fuel composition of this invention is achieved.

Fission gas behavior in the fuel element is of concern because fission gases could cause fuel and cladding swelling, leading to eventual rupture. To minimize the fuel-clad mechanical interaction caused by fission-gas-induced fuel swelling, it has been proposed to incorporate interconnected or open porosity into the volume of the fuel, thus facilitating gas-fission release into a gas plenum or into a venting system. The open porosity also provides sites for solid fission products.

The production of hypostoichiometric fuel pellets having a desirable degree of interconnected or open porosity can be readily achieved by preparing mixed-oxide fuel pellets having a density in the range 85 to just below 90 percent of theoretical density, heating the fuel to a temperature in the range of 1450° to 1550° C. in a reducing atmosphere such as an argon atmosphere containing 4 to 6 volume percent hydrogen until a desired hypostoichiometry is achieved, and then cooled the hypostoichiometric fuel in the same atmosphere to room temperature.

Tests have shown that, while we could impart the desired degree of hypostoichiometry in mixed-oxide fuel pellets having a desired density, the gas-release properties of the final products were varied, non-reproducible, and excessive. This means to say that, when the hypostoichiometric fuel was produced and then reheated to a temperature of about 1600° C., the volume of gas in each batch of fuel treated in exactly the same manner would release differing and frequently abnormally high volumes of gas. Calculations showed that in many cases the volume of gas was such that it could easily cause added effects upon fuel element integrity and require additional gas plenum volume. These calculations have further shown that, if the gas-evolution index is less than about 0.1 cubic centimeter of gas per gram of fuel (exclusive of water vapor, which may be a maximum of 30 parts water per million parts fuel), the nonfission-gas buildup will not be detrimental. This gas-evolution index is measured by heating the fuel at 1600° C. for about 20 minutes. Systematic studies of this gas-release problem have shown that the nonfission product gas released after reheating the hypostoichiometric fuel consists almost exclusively of hydrogen gas.

Similar problems exit with high-density fuels having a large surface-to-volume ratio, such as microspheres. Such microspheres, which may be 50–500$\mu$ in diameter and have a density approaching theoretical, release gas well in excess of the 0.1 cc. of gas per gram of fuel and thereby would create gas problems in a fuel element. This gas-release characteristic thus appears to be a problem when the surface-to-volume ratio of any fuel, regardless of density, exceeds about 100 in.$^{-1}$. This corresponds to a fuel pellet having a density of less than 90% theoretical, or a microsphere smaller than about 1000$\mu$.

It is therefore the principal object of this invention to produce a hypostoichiometric oxide fuel having predictable and reproducible gas-release properties.

Another object of the invention is to provide a stabilized hypostoichiometric nuclear oxide fuel composition having a surface-to-volume ratio of at least 100 in.$^{-1}$ and a gas-release index of less than 0.1 and preferably less than 0.05 cc. per gram of fuel released at 1600° C. over a period of 20 minutes (as measured under standard conditions of temperature and pressure).

It is an additional object to provide a process which allows realization of the aforementioned objects.

SUMMARY OF THE INVENTION

The product and process aspects of our invention are based on the discovery that the presence of an atmosphere of hydrogen surrounding a mixed-oxide fuel element of the type described herein below a critical temperature determined to be about 800° C. will cause the hydrogen to be selectively retained by the fuel to be available for subsequent release during heating to an elevated temperature. Adverse gas release had not previously been recognized as a critical problem since most fuel pellets were manufactured to a density of at least and preferably in excess of 90% theoretical. Subsequent careful experimentation has shown that even under such conditions there will be a gas release, but of such low value that it is essentially within safe limits, i.e., within such limits as not to produce adverse chemical or physical results. On the other hand, as the density of hypostoichiometric fuel pellets decreases from about 90% theoretical, we have found that the gas-release index increases to undesirable values. For example, a mixed Pu-U oxide pellet having a density greater than 90% theoretical heated to a temperature of 1600° C. showed a gas-release index of about 0.1 as compared to an index of 0.8 for a mixed-oxide fuel pellet having a density of about 85% theoretical.

Furthermore, we have found that small fuel particles of high density, such as microspheres of less than 1000-$\mu$ diameter release excessive equantities of gas when heated to 1600° C. for about 20 minutes. The gas-release index for these fuels is frequently at least 0.4 cc./g. fuel. Although we do not know the exact mechanism of gas retention during forming hypostoichiometric and release during subsequent heating, we recognize that the problem exists when the surface-to-volume ratio of the hypostoichiometric fuel is greater than about 100 in.$^{-1}$ In accordance wtih the process aspects of this invention, therefore, we are able to reduce the gas-release index of hypostoichiometric fuels having surface-to-volume ratios greater than 100 in.$^{-1}$ by insuring that the fuel is not exposed to hydrogen during a cooling cycle below a temperature of 800° C. This means that, when it is desired to induce a hypostoichiometric condition in a mixed-oxide fuel containing Pu and having a surface-to-volume ratio greater than 100 in.$^{-1}$, an essentially hydrogen-free atmosphere should be insured as the fuel element is cooled from hypostoichiometric-inducing conditions of temperature and reducing atmosphere.

Prior workers in this technology have always assumed the necessity, as far as we are aware, for maintaining a reducing atmosphere even after hypostoichiometry is produced in order to, as was thought, maintain hypostoichiometry or, stated in other terms, avoid oxidation during cooling. On the other hand, we find that not only can the hypostoichiometric condition be maintained in the absence of hydrogen below 800° C., but that it is critically necessary in order to avoid the undesirable gas-evolution effects shown on reheating the hypostoichiometric fuel. Thus, the process of our invention provides a modification of the heat-treatment cycle following induction of the hypostoichiometric state in a mixed-oxide fuel having a surface-to-volume ratio greater than 100 in.$^{-1}$ which involves cooling the hypostoichiometric fuel from about 800° C. in an essentially hydrogen-free non-reducing atmosphere. In operational terms, this simply means that, as the hypostoichiometric fuel is cooled from its hypostoichiometric-inducing temperature, care must be taken to eliminate the presence of hydrogen as the fuel reaches a temperature of 800° C. Thus, the atmosphere which will avoid adverse gas release can be any non-oxidizing inert gas such as argon or helium. By "inert" or "non-oxidizing" we mean any gaseous medium which would not convert the hypostoichiometric fuel to a stoichiometric or hyperstoichiometric condition. In its essential terms, therefore, the process of our invention consists of a single step incorporated into an over-all hypostoichiometric-inducing operation which avoids the adverse gas-release effect previously described. In converse terms, we can employ our discovery to produce a desired minimum gas-release index for previously prepared hypostoichiometric fuels by heating the fuel to a temperature above 800° C. in an inert, non-oxidizing atmosphere and thereafter cooling the fuel in an inert hydrogen-free atmosphere.

Having described the invention in general terms, together with the significance of producing an improved stability, the following representative embodiments are provided which show the improvement obtained by controlling the tamosphere of gas surrounding the hypostoichiometric oxide fuel.

EXAMPLE I

Prior-art procedure

Pellets of sol-gel-derived (.8 U-.2 Pu)O$_2$ having a density of about 9.0 g./cm.$^3$ (~85% theoretical) were heated to 1450° C. in an argon atmosphere containing 4% H$_2$. The heating rate was 300° C./hr. and the gas flow rate was 2.5 c.f.h. The temperature was held at 1450° C. until the effluent moisture content dropped to 30 p.p.m., corresponding to an oxygen-to-metal ratio of about 1.97. The pellets were then cooled to room temperature in the same atmosphere. These pellets were then placed in an evacuated chamber and heated to 1600° C. for 20 minutes. The pressure rise in the chamber was used to compute the gas released from these pellets. This value ranged from about 0.5 to 1.0 cm.$^3$/g. fuel.

Modified procedure

Pellets of similar (U-Pu)O$_2$ were heat treated as in the prior-art procedure with one exception: During the cooling cycle the gas was changed to essentially pure argon (no hydrogen) at about 800° C. and cooling then continued to room temperature. These product pellets were then heated at 1600° C. to determine gas evolution as above. In all cases, the gas release did not exceed 0.05 cm.$^3$/g.

EXAMPLE II

Prior-art procedure

Two groups of microspheres of (U-Pu)O$_2$ were converted to hypostoichiometric oxide in a manner identical to the prior-art method described in Example I. One group, having an average diameter of about 500$\mu$, had a density of about 96% of theoretical. The fine microspheres were about 50$\mu$ in diameter and had a density of greater than 99.9% theoretical. When the larger particles were subsequently heated to 1600° C. for 20 minutes, the gas-release index was determined to be 0.2 to 0.3 cc./g. fuel. These larger microspheres had a surface-to-volume ratio of about 200 in.$^{-1}$. The smaller microspheres, having a surface-to-volume ratio of about 2000 in.$^{-1}$, released about 0.4 cc./g. fuel.

Modified procedure

Additional microspheres of both the 500-$\mu$ size and the 50-$\mu$ size were converted to hypostoichiometric oxides having an oxygen-to-metal ratio of about 1.97. This was accomplished by heating in an argon-4% H$_2$ atmosphere at about 1450° C. until the water content of the effluent gas was 30 p.p.m. They were then cooled in the same atmosphere to about 800° C. and cooled thereafter to room temperature in substantially pure argon. When reheated to 1600° C. in an evacuated chamber, the gas-release index for the 500-$\mu$ microspheres was 0.05 and that of the 50-$\mu$ microspheres was 0.1 cc./g. fuel.

What is claimed is:

1. An improved nuclear fuel composition characterized as a hypostoichiometric solid solution of an oxide of plutonium and uranium, having a surface-to-volume ratio of greater than 100 in.$^{-1}$ and a gas-release index of no more than 0.1 cc./g. of fuel as measured at 1600° C.

2. The nuclear fuel composition of claim 1 in the form of a microsphere 50 to 500 microns in diameter and having a density greater than 90 percent theoretical.

3. A nuclear fuel pellet characterized as a hypostoichiometric solid solution of plutonium and uranium oxide, having a density in the range 85 to less than 90 percent theoretical, interconnected porosity, and a gas-release index of less than 0.1 cc./g. of fuel as measured at 1600° C.

4. In a process for stabilizing the gas-release properties of a nuclear fuel consisting of a solid solution of an oxide of plutonium and uranium, having a surface-to-volume ratio of greater than 100 in.$^{-1}$, the combination of steps which comprise heating said composition in a hydrogen-containing atmosphere under conditions sufficient to convert the composition to a hypostoichiometric condition and cooling said hypostoichiometric composition from a temperature of about 800° C. to room temperature in an inert argon or helium atmosphere.

References Cited

UNITED STATES PATENTS

| 3,375,306 | 3/1968 | Russell et al. | 264—5 |
| 3,531,416 | 9/1970 | Akutsu et al. | 252—301.1 |
| 3,254,030 | 5/1966 | Michaud et al. | 252—301.1 |
| 3,354,044 | 11/1967 | Robertson | 252—301.1 X |
| 3,462,371 | 8/1969 | Robertson | 252—301.1 |

OTHER REFERENCES

Roth et al.: "The Effects of Stoichiometry on the Thermal Expansion of 20 wt. percent $PuO_2$-$UO_2$ Fast-Reactor Fuel," Tran. Am. Nuc. Soc. vol. 10, 1967, pp. 457–8.

CARL D. QUARFORTH, Primary Examiner

R. L. TATE, Assistant Examiner

U.S. Cl. X.R.

176—89; 264—0.5